US012266977B2

(12) United States Patent
Suzuki et al.

(10) Patent No.: US 12,266,977 B2
(45) Date of Patent: Apr. 1, 2025

(54) ROTOR AND ELECTRIC MOTOR

(71) Applicant: Panasonic Intellectual Property Management Co., Ltd., Osaka (JP)

(72) Inventors: Kenta Suzuki, Osaka (JP); Eiki Morimoto, Osaka (JP); Hajime Ukaji, Aichi (JP); Toshiyuki Tamamura, Osaka (JP); Noritaka Aso, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 331 days.

(21) Appl. No.: 17/995,654

(22) PCT Filed: Feb. 8, 2021

(86) PCT No.: PCT/JP2021/004500
§ 371 (c)(1),
(2) Date: Oct. 6, 2022

(87) PCT Pub. No.: WO2021/210249
PCT Pub. Date: Oct. 21, 2021

(65) Prior Publication Data
US 2023/0117552 A1 Apr. 20, 2023

(30) Foreign Application Priority Data
Apr. 15, 2020 (JP) .................. 2020-072707

(51) Int. Cl.
*H02K 1/276* (2022.01)
*H02K 1/16* (2006.01)
*H02K 1/28* (2006.01)

(52) U.S. Cl.
CPC ............ *H02K 1/2766* (2013.01); *H02K 1/16* (2013.01); *H02K 1/28* (2013.01); *H02K 2213/03* (2013.01)

(58) Field of Classification Search
CPC ........ H02K 1/276; H02K 1/2766; H02K 1/22; H02K 1/27; H02K 1/2706; H02K 1/148;
(Continued)

(56) References Cited

U.S. PATENT DOCUMENTS

2010/0301697 A1    12/2010   Takahashi et al.
2012/0200188 A1     8/2012   Sano et al.
(Continued)

FOREIGN PATENT DOCUMENTS

EP    3288156 A1    2/2018
JP    8-275419      10/1996
(Continued)

OTHER PUBLICATIONS

The EPC Office Action dated Aug. 22, 2023 for the related European Patent Application No. 21788344.6.
(Continued)

*Primary Examiner* — Bryan R Perez
(74) *Attorney, Agent, or Firm* — Rimon P.C.

(57) ABSTRACT

A rotor includes: a rotor core including a plurality of first holes and a plurality of second holes; and a plurality of first permanent magnets arranged in the plurality of first holes, wherein the first holes and the second holes are provided radially around a rotating shaft, the rotor core in each of the plurality of second holes has a radial length smaller than a radial length of the rotor core in each of the plurality of first holes, each of the plurality of second holes is located closer to an inner side in the radial direction of the rotor core with respect to a first hole adjacent to the second hole in a circumferential direction of the rotor core among the plurality of first holes, and includes a protrusion protruding toward the first hole adjacent to the second hole in the circumferential direction of the rotor core.

17 Claims, 13 Drawing Sheets

(58) Field of Classification Search
CPC ........ H02K 1/2773; H02K 1/02; H02K 1/278; H02K 1/2746; H02K 1/28; H02K 1/274
See application file for complete search history.

(56) References Cited

U.S. PATENT DOCUMENTS

| | | | |
|---|---|---|---|
| 2014/0111053 A1* | 4/2014 | Yoshizawa ............ | H02K 1/2773 310/156.53 |
| 2014/0306569 A1* | 10/2014 | Kojima .................. | H02K 15/03 29/598 |
| 2015/0115758 A1* | 4/2015 | Koka ..................... | H02K 21/14 318/139 |
| 2015/0229170 A1 | 8/2015 | Samuel et al. | |

FOREIGN PATENT DOCUMENTS

| | | |
|---|---|---|
| JP | 2009-136040 A | 6/2009 |
| JP | 2013-074718 A | 4/2013 |
| JP | 2014-192907 A | 10/2014 |
| JP | 2014-207810 A | 10/2014 |
| JP | 2017-005857 A | 1/2017 |
| JP | 2019-213431 A | 12/2019 |
| WO | 2018/131402 A1 | 7/2018 |

OTHER PUBLICATIONS

International Search Report of PCT application No. PCT/JP2021/004500 dated Apr. 6, 2021.

* cited by examiner

ROTOR AND ELECTRIC MOTOR

FIELD OF THE INVENTION

The present disclosure relates to a rotor and an electric motor including the rotor. The present disclosure particularly relates to a permanent magnet-embedded rotor in which a permanent magnet is disposed in an iron core, and an electric motor including the rotor.

DESCRIPTION OF THE RELATED ART

Electric motors are used in various electric devices such as household devices or industrial devices. As the electric motor, an interior permanent magnet (IPM) motor having a rotor in which a permanent magnet is embedded in an iron core is known. In the IPM motor, in addition to magnet torque by the permanent magnet embedded in the iron core, reluctance torque due to the unevenness of a magnitude of magnetic resistance generated in the iron core can be obtained. This enables realizing a motor having a small size and high efficiency.

Conventionally, as a rotor of an IPM motor, an IPM rotor is known which includes an iron core in which a plurality of first magnet arrangement holes and a plurality of second magnet arrangement holes are alternately provided in a circumferential direction, first permanent magnets that are arranged in the first magnet arrangement holes and in which a magnetic pole direction is a circumferential direction of the iron core, and second permanent magnets that are arranged in the second magnet arrangement holes and in which a magnetic pole direction is a radial direction of the iron core (for example, PTL 1).

However, in the conventional IPM type rotor, since there are few regions of the iron core through which a magnetic flux of the first permanent magnet can pass in the first permanent magnet and the second permanent magnet adjacent to each other, there is a problem that the second magnet arrangement hole interferes with the magnetic flux of the first permanent magnet, and an interlinkage magnetic flux interlinking with a stator decreases.

CITATION LIST

Patent Literature

PTL 1: Unexamined Japanese Patent Publication No. H08-275419

SUMMARY OF THE INVENTION

The present disclosure has been made to solve such a problem, and an object thereof is to provide a rotor and an electric motor capable of increasing an interlinkage magnetic flux.

In order to achieve the above object, one aspect of a rotor according to the present disclosure includes: an iron core including a plurality of first holes and a plurality of second holes; a plurality of first permanent magnets arranged in the plurality of first holes, respectively; and a rotating shaft fixed to the iron core, wherein the plurality of first holes and the plurality of second holes are provided radially around the rotating shaft, each of the plurality of first holes extends in a radial direction of the iron core, the iron core in each of the plurality of second holes has a radial length smaller than a radial length of the iron core in each of the plurality of first holes, each of the plurality of second holes is located closer to an inner side in the radial direction of the iron core with respect to a first hole adjacent to the second hole in a circumferential direction of the iron core among the plurality of first holes, and includes a protrusion protruding toward the first hole adjacent to the second hole in the circumferential direction of the iron core.

Further, an aspect of an electric motor according to the present disclosure includes: one aspect of the rotor; and a stator that is disposed to face the rotor via an air gap and generates a magnetic force acting on the rotor.

According to the present disclosure, an interlinkage magnetic flux can be increased.

DETAILED DESCRIPTION OF THE PREFERRED EMBODIMENTS

Hereinafter, an exemplary embodiment of the present disclosure will be described. Note that the exemplary embodiment described below illustrates a specific example of the present disclosure. Therefore, numerical values, constituent elements, arrangement positions and connection modes of the constituent elements, and steps, order of the steps, and the like shown in the following exemplary embodiment are merely examples, and are not intended to limit the present disclosure. Thus, among the constituent elements in the following exemplary embodiment, constituent elements that are not described in independent claims indicating the highest concept of the present disclosure are described as optional constituent elements.

Further, each of the drawings is a schematic view, and is not necessarily precisely illustrated. Note that, in each drawing, substantially the same configurations are denoted by the same reference marks to eliminate or simplify duplicated description.

Exemplary Embodiment

Figure 1:
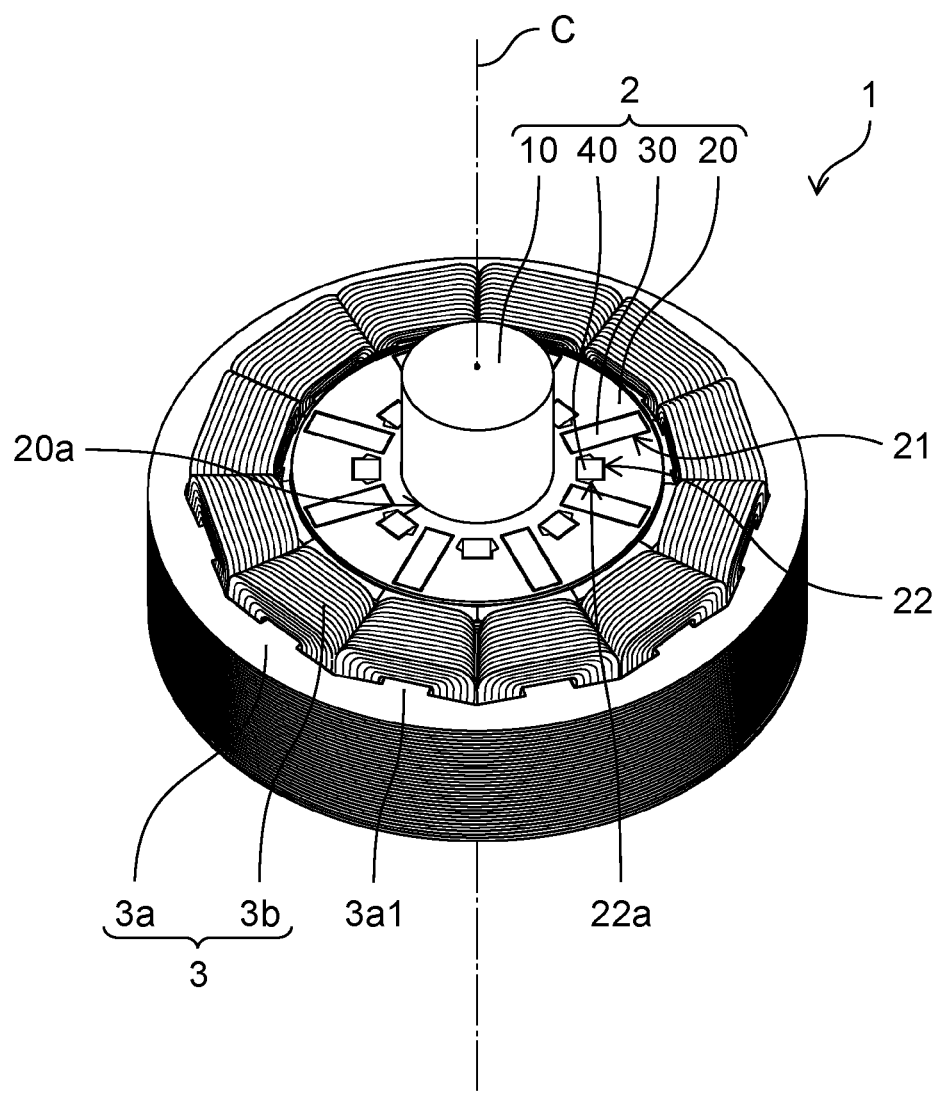
FIG. 1 is a perspective view of an electric motor according to an exemplary embodiment.
Figure 2:
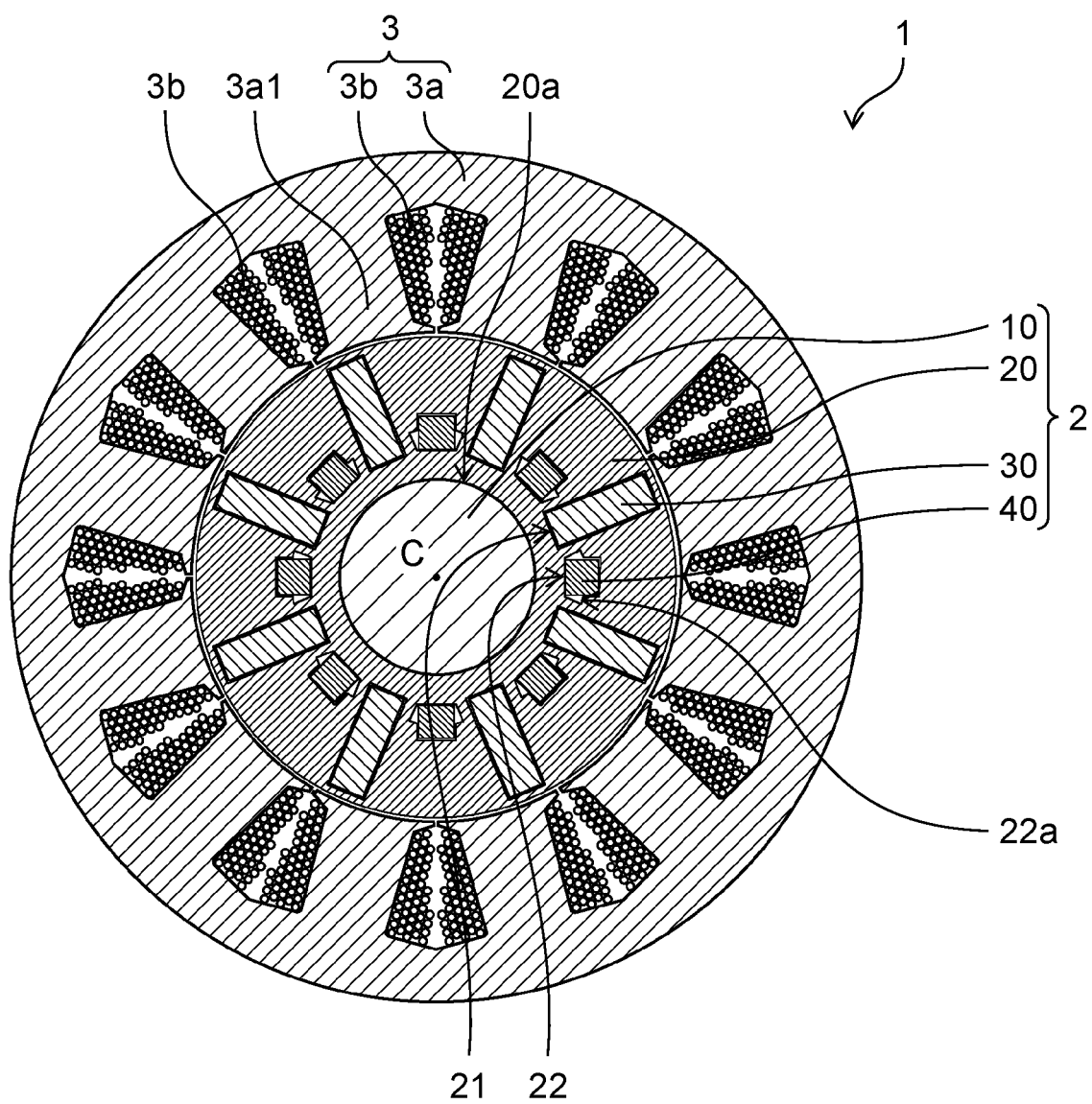
FIG. 2 is a cross-sectional view of the electric motor according to the exemplary embodiment.

First, a schematic configuration of electric motor 1 according to the exemplary embodiment will be described with reference to FIGS. 1 and 2. FIG. 1 is a perspective view of electric motor 1 according to the exemplary embodiment. FIG. 2 is a cross-sectional view of above electric motor 1. Note that FIG. 2 illustrates a cross section taken along a plane orthogonal to rotating shaft 10.

As illustrated in FIGS. 1 and 2, electric motor 1 includes rotor 2 and stator 3. Electric motor 1 is an inner rotor type motor in which rotor 2 is disposed inside stator 3. That is, stator 3 is configured to surround rotor 2.

Rotor 2 (rotor) rotates by a magnetic force generated in stator 3. Specifically, rotor 2 has rotating shaft 10, and rotates about shaft center C of rotating shaft 10 as a rotation center.

Rotor 2 generates a magnetic force acting on stator 3. Rotor 2 has a configuration in which a plurality of N poles and S poles, which are main magnetic fluxes, are repeatedly present over a circumferential direction. A direction of a main magnetic flux generated by rotor 2 is a direction orthogonal to a direction (rotation axis direction) of shaft center C of rotating shaft 10.

Rotor 2 is disposed with respect to stator 3 via an air gap. Specifically, a minute air gap exists between a surface of rotor 2 and a surface of stator 3. Although details will be described later, rotor 2 is a permanent magnet embedded rotor (IPM rotor) in which a permanent magnet is embedded in an iron core. Therefore, electric motor 1 in the present exemplary embodiment is an IPM motor.

Stator 3 (stator) is disposed facing rotor 2 via an air gap, and generates a magnetic force acting on rotor 2. Specifically, stator 3 is disposed so as to surround rotor core 20 of rotor 2. Stator 3 constitutes a magnetic circuit together with rotor 2.

Stator 3 is configured such that N poles and S poles are alternately generated in the circumferential direction as main magnetic fluxes on an air gap surface. Stator 3 includes stator cores 3a (stator core) and winding coils 3b (stator coil).

Stator cores 3a are provided with a plurality of teeth 3a1 protruding toward rotor core 20 of rotor 2. Specifically, the plurality of teeth 3a1 are provided so as to protrude toward shaft center C of rotating shaft 10. Further, the plurality of teeth 3a1 are provided at equal intervals in the circumferential direction. Therefore, the plurality of teeth 3a1 radially extend in a direction (radial direction) orthogonal to shaft center C of rotating shaft 10.

Each of stator core 3a is formed of, for example, a plurality of steel sheets stacked in the direction of shaft center C of rotating shaft 10. Each of the plurality of steel sheets is, for example, an electromagnetic steel sheet punched into a predetermined shape. Note that stator core 3a is not limited to a stacked body of the plurality of steel sheets, and may be a bulk body made of a magnetic material.

Each of winding coils 3b is wound around each of the plurality of teeth 3a1 of stator core 3a. Specifically, winding coil 3b is wound around each of teeth 3a1 via an insulator. Each winding coil 3b is constituted by unit coils of three phases of a U phase, a V phase, and a W phase which are electrically different from each other by 120 degrees. That is, winding coil 3b wound around each tooth 3a1 is energized and driven by three-phase alternating current energized in units of phases of the U phase, the V phase, and the W phase. As a result, a main magnetic flux of stator 3 is generated in each tooth 3a1.

In electric motor 1 configured as described above, when winding coil 3b of stator 3 is energized, a field current flows through winding coil 3b to generate a magnetic flux in stator 3. A magnetic force generated by the interaction between the magnetic flux of stator 3 and the magnetic flux of rotor 2 becomes a torque for rotating rotor 2, and rotor 2 rotates.

Figure 3:
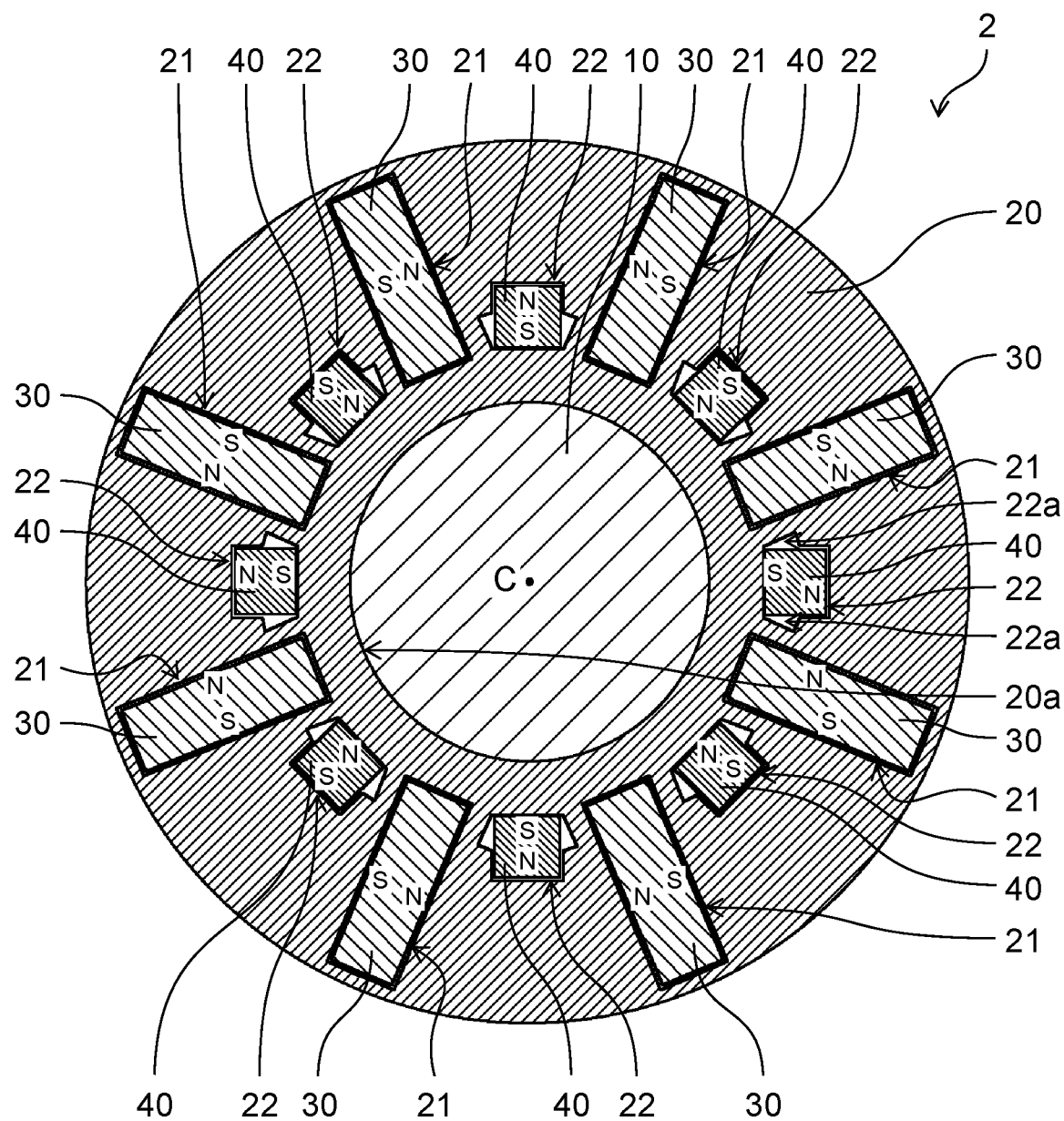
FIG. 3 is a cross-sectional view of a rotor according to the exemplary embodiment.
Figure 4:
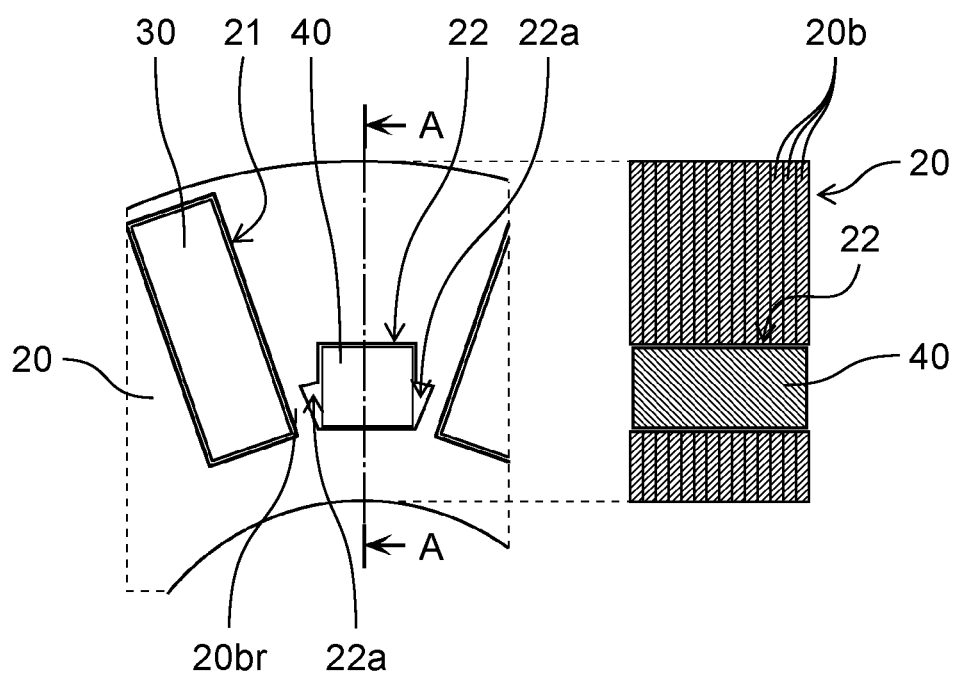
FIG. 4 is an enlarged plan view illustrating a part of the rotor according to the exemplary embodiment and a cross-sectional view taken along line A-A in the enlarged plan view.

Next, a detailed configuration of rotor 2 according to the present exemplary embodiment will be described with reference to FIGS. 3 and 4 while referring to FIGS. 1 and 2. FIG. 3 is a cross-sectional view of rotor 2 according to the exemplary embodiment. FIG. 4 is an enlarged plan view illustrating a part of rotor 2, and a cross-sectional view taken along line A-A of the enlarged plan view. Note that FIG. 3 illustrates a cross section taken along a plane orthogonal to rotating shaft 10.

As illustrated in FIGS. 1 to 3, rotor 2 includes rotating shaft 10, rotor core 20, a plurality of first permanent magnets 30, and a plurality of second permanent magnets 40.

Rotating shaft 10 is an elongated shaft serving as a center when rotor 2 rotates. Rotating shaft 10 is, for example, a metal rod and is fixed to the center of rotor 2. Specifically, rotating shaft 10 is fixed to rotor core 20 while penetrating the center of rotor core 20 of rotor 2 so as to protrude to both sides of rotor 2. Rotating shaft 10 is fixed to rotor core 20 by being press-fitted or shrink-fitted into through hole 20a formed at the center of rotor core 20.

Note that, although not illustrated, a first part of rotating shaft 10 protruding to one side of rotor 2 is supported by a first bearing, and a second part of rotating shaft 10 protruding to the other side of rotor 2 is supported by a second bearing. Note that a load driven by electric motor 1 is attached to the first part or the second part of rotating shaft 10.

Rotor core 20 (rotor core) is an iron core having a plurality of first holes 21 and a plurality of second holes 22. As illustrated in FIG. 4, rotor core 20 includes a plurality of steel sheets 20b stacked in a direction of shaft center C of rotating shaft 10. Specifically, rotor core 20 is a substantially cylindrical stacked body in which the plurality of steel sheets 20b are stacked in the direction of shaft center C of rotating shaft 10. Each of the plurality of steel sheets 20b is, for example, an electromagnetic steel sheet punched into a predetermined shape, and is fixed to each other by caulking or the like.

As illustrated in FIG. 3, the plurality of first holes 21 and the plurality of second holes 22 are radially provided around the rotating shaft 10. Here, the term "radial" is a concept including a substantially radial shape, and it also includes a form that is displaced due to a manufacturing error. The plurality of first holes 21 are provided at equal intervals along a circumferential direction of rotor core 20 (a rotation direction of rotating shaft 10). Similarly, the plurality of second holes 22 are provided at equal intervals along the circumferential direction of rotor core 20. First holes 21 and second holes 22 are alternately provided along the circumferential direction. As illustrated in FIG. 4, each of first holes 21 and second holes 22 is a through hole penetrating rotor core 20 along the direction of shaft center C of rotating shaft 10. Further, in an arbitrary cross section taken along a plane orthogonal to rotating shaft 10, the cross-sectional shape of each of first holes 21 is the same in the direction of shaft center C of rotating shaft 10, and the cross-sectional shape of each of second holes 22 is the same in the direction of shaft center C of rotating shaft 10. Therefore, first holes 21 having the same shape and second holes 22 having the same shape are formed in all steel sheets 20b constituting rotor core 20.

As illustrated in FIG. 3, in plan view, each of the plurality of first holes 21 extends in the radial direction of rotor core 20 (direction orthogonal to the direction of shaft center C of rotating shaft 10). Therefore, the plurality of elongated first holes 21 are formed in a spoke shape around rotating shaft 10. A planar view shape of each of first holes 21 is a rectangle in which the radial direction of rotor core 20 is a longitudinal direction. The planar view shape of each of the plurality of first holes 21 is the same as those of the others.

On the other hand, in plan view, a length of each of the plurality of second holes 22 in the radial direction of rotor core 20 is smaller than a length of each of first holes 21. That is, a radial length of rotor core 20 in each of the plurality of second holes 22 is shorter than a radial length of rotor core 20 in each of the plurality of first holes 21. In the present exemplary embodiment, the radial length of rotor core 20 in second hole 22 is less than or equal to half radial length of rotor core 20 in first hole 21. The planar view shape of each of the plurality of second holes 22 is the same as the other shapes. Note that a specific planar view shape of second hole 22 will be described later.

The plurality of first permanent magnets 30 are arranged in the plurality of first holes 21, respectively. That is, each of first holes 21 is a first magnet arrangement hole in which each of first permanent magnets 30 is arranged. First permanent magnet 30 is a sintered magnet. Therefore, first hole 21 is a magnet insertion hole, and first permanent magnet 30 that is a sintered magnet is inserted into first hole 21. One first permanent magnet 30 is inserted into one first hole 21.

First permanent magnet 30 is a main magnet in rotor 2. Specifically, first permanent magnet 30 is arranged such that a magnetic pole direction is the circumferential direction of rotor core 20 (the rotation direction of rotating shaft 10). That is, first permanent magnet 30 is magnetized such that the magnetic pole direction is the circumferential direction of rotor core 20. Note that in two adjacent first permanent magnets 30, directions of the magnetic poles of an S pole and an N pole are opposite to each other.

The planar view shape and size of first permanent magnet 30 are substantially the same as the planar view shape and size of first hole 21. First permanent magnet 30 is fitted into first hole 21. Therefore, the planar view shape of first permanent magnet 30 is an elongated rectangle. As an example, first permanent magnet 30 is a plate-shaped rectangular parallelepiped.

In each of first holes 21, a slight gap (clearance) may exist between first permanent magnet 30 and an inner surface of first hole 21. An adhesive for adhering and fixing first permanent magnet 30 to first hole 21 may be provided in the gap. On the other hand, the adhesive may not be provided in this gap. The gap between first permanent magnet 30 and the inner surface of first hole 21 only needs to ensure a minimum dimensional tolerance required in manufacturing.

Further, the plurality of second permanent magnets 40 are arranged in the plurality of second holes 22. That is, each of second holes 22 is a second magnet arrangement hole in which each of second permanent magnet 40 is arranged. Second permanent magnet 40 is a sintered magnet. Therefore, second hole 22 is a magnet insertion hole, and second permanent magnet 40 that is a sintered magnet is inserted into second hole 22. One second permanent magnet 40 is inserted into one second hole 22.

Second permanent magnet 40 is an auxiliary magnet in rotor 2. Specifically, second permanent magnet 40 is arranged such that a magnetic pole direction is the radial direction of rotor core 20 (a direction orthogonal to rotating shaft 10). That is, second permanent magnet 40 is magnetized such that the magnetic pole direction is the radial direction of rotor core 20. Note that in two adjacent second permanent magnets 40, directions of the magnetic poles of an S pole and an N pole are opposite to each other.

A planar view shape of second permanent magnet 40 is different from a planar view shape of second hole 22. The shape of second permanent magnet 40 in plan view is a rectangle having a small aspect ratio. As an example, second permanent magnet 40 is a rod-like rectangular parallelepiped.

Each of the plurality of second holes 22 has protrusion 22a. In each of second holes 22, protrusion 22a is located closer to an inner side in the radial direction of rotor core 20 with respect to first hole 21 adjacent to second hole 22 in the circumferential direction of rotor core 20 among the plurality of first holes 21, and protrudes toward first hole 21 adjacent to second hole 22 in the circumferential direction of rotor core 20.

A planar view shape of each of second holes 22 is a shape obtained by adding protrusion 22a to a shape equivalent to the planar view shape of second permanent magnet 40. That is, the planar view shape of each of second holes 22 is a shape in which protrusion 22a is added to a side of a rectangle having a small aspect ratio.

In each of the plurality of second holes 22, protrusion 22a is located closer to the inner side in the radial direction of rotor core 20. That is, protrusion 22a does not protrude from the entire one side of a rectangular part of second hole 22, but protrudes from a part closer to the inside of one side of the rectangular part of second hole 22.

In each of second holes 22, a shape of protrusion 22a in plan view is a shape having a vertex and a width narrowing toward the vertex. Further, in each of second holes 22, protrusion 22a has an opposing side opposed to one side of first hole 21 adjacent to second hole 22. An angle formed by the opposing side and one side of adjacent first hole 21 is preferably in a range from −5° to 5° inclusive. In the present exemplary embodiment, the opposing side of protrusion 22*a* is parallel to one side of first hole 21 adjacent to protrusion 22*a*. Specifically, protrusion 22*a* has a triangular shape in plan view, and one side of the triangle is parallel to one side of first hole 21. As a result, as illustrated in FIG. 4, a width of bridge part 20*br* that is a part between protrusion 22*a* and first hole 21 is constant.

In each of the plurality of second holes 22, protrusions 22*a* are provided on both sides of a center line extending in the radial direction of rotor core 20 in second hole 22. That is, protrusion 22*a* protrudes from each of two opposing sides of the rectangular part of second hole 22. Therefore, the planar view shape of second hole 22 is a shape obtained by adding a rectangle having a small aspect ratio, which is the planar view shape of second permanent magnet 40, and a triangle protruding from a part on the inner side of each of two opposing sides of the rectangle.

Note that in each of the plurality of second holes 22, two protrusions 22*a* are provided line-symmetrically with respect to the center line of second hole 22 extending in the radial direction of rotor core 20.

Second permanent magnet 40 arranged in second hole 22 is located in a rectangular part of second hole 22. Therefore, in each of second holes 22, protrusion 22*a* is not occupied by second permanent magnet 40 and remains as a void. That is, second permanent magnet 40 does not exist in protrusion 22*a*, and protrusion 22*a* is a void part (space region).

Note that in the rectangular part of each of second holes 22, a slight gap (clearance) may exist between second permanent magnet 40 and an inner surface of second hole 22. An adhesive for adhering and fixing second permanent magnet 40 to second hole 22 may be provided in the gap. In this case, an adhesive for fixing second hole 22 and second permanent magnet 40 may be present in at least a part of protrusion 22*a*. In the rectangular part of each of second holes 22, no adhesive may be provided in the gap between second permanent magnet 40 and the inner surface of second hole 22. That is, in the rectangular part of each of second holes 22, the gap between second permanent magnet 40 and the inner surface of second hole 22 only needs to ensure a minimum dimensional tolerance required in manufacturing.

Rotor 2 configured as described above is an 8-pole rotor having eight magnetic poles, and eight first permanent magnets 30 and eight second permanent magnets 40 are arranged in the circumferential direction so that the magnetic poles of the S pole and the N pole are alternately positioned in the circumferential direction as a main magnetic flux. That is, rotor core 20 is alternately provided with eight first holes 21 and eight second holes 22.

Figure 5:
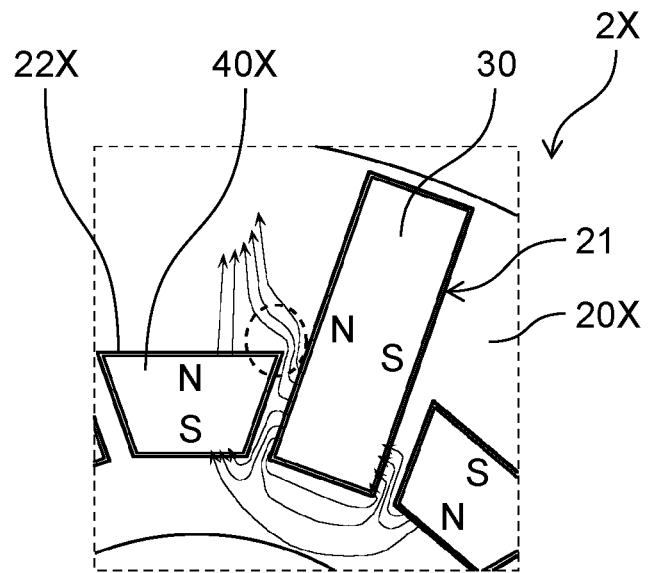
FIG. 5 is an enlarged plan view illustrating a part of a rotor of a first comparative example in an enlarged manner.
Figure 6:
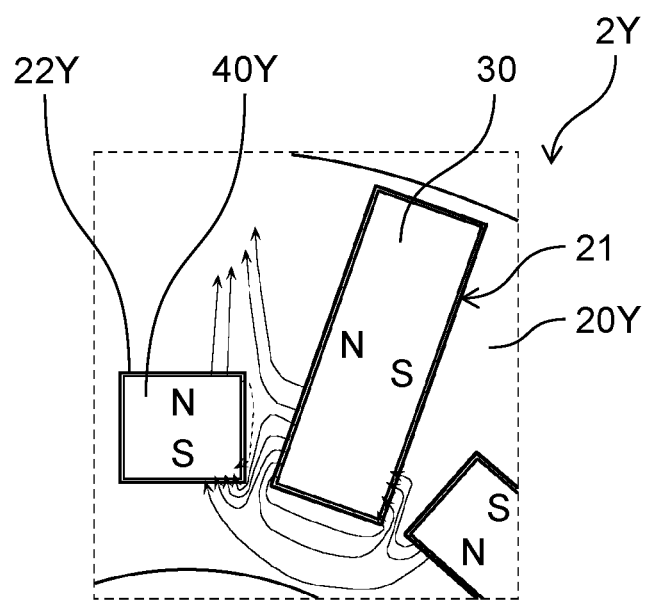
FIG. 6 is an enlarged plan view illustrating a part of a rotor of a second comparative example in an enlarged manner.
Figure 7:
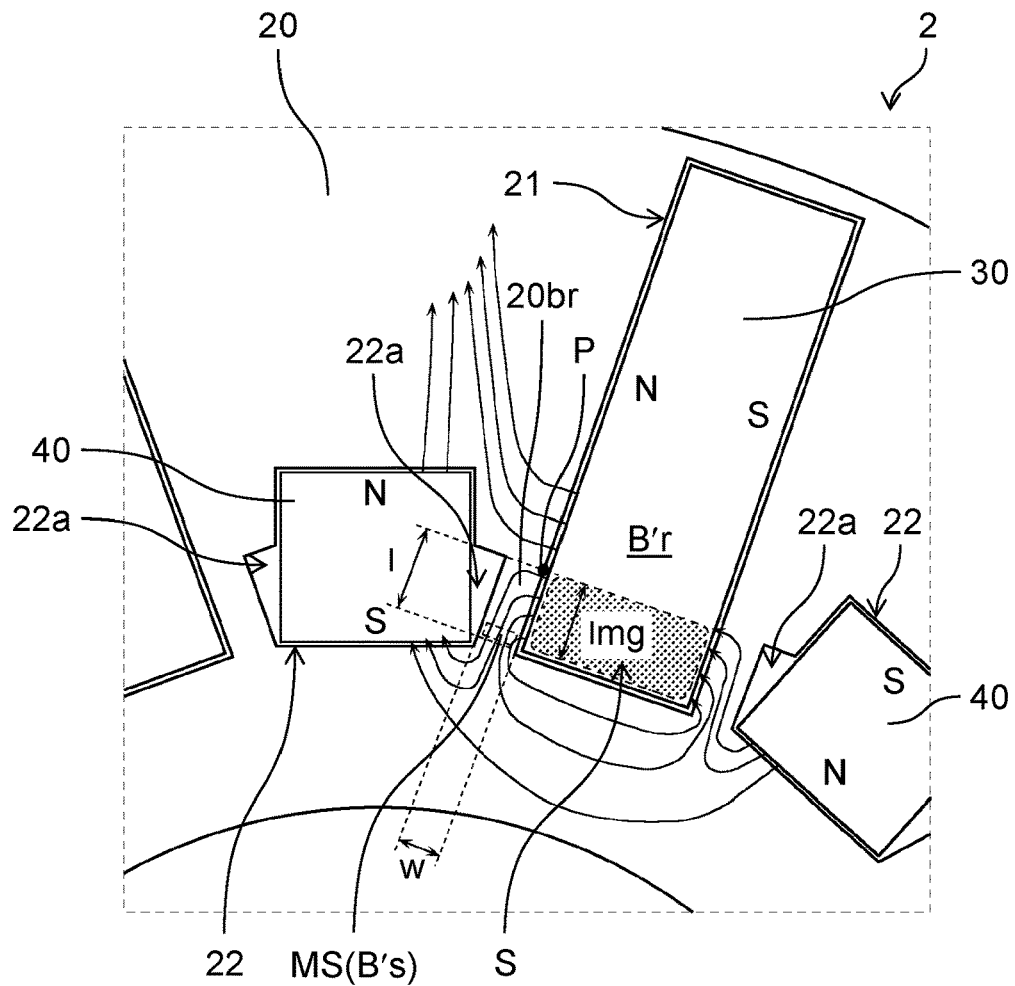
FIG. 7 is an enlarged plan view illustrating a part of the rotor according to the exemplary embodiment in an enlarged manner.

Next, operation and effects of rotor 2 and electric motor 1 according to the present exemplary embodiment, including circumstances leading to the present disclosure, will be described with reference to FIGS. 5 to 7. FIG. 5 is an enlarged plan view illustrating a part of rotor 2X of a first comparative example in an enlarged manner. FIG. 6 is an enlarged plan view illustrating a part of rotor 2Y of a second comparative example in an enlarged manner. FIG. 7 is an enlarged plan view illustrating a part of rotor 2 according to the exemplary embodiment in an enlarged manner. Note that in FIGS. 5 to 7, arrows indicate a flow of a magnetic flux.

As illustrated in FIG. 5, in rotor 2X of the first comparative example, similarly to rotor 2 in the above-described exemplary embodiment, first hole 21 and second hole 22X are provided in rotor core 20X. In rotor 2X, first permanent magnet 30 is disposed in first hole 21, and second permanent magnet 40X is disposed in second hole 22X.

However, in rotor 2X of the first comparative example, unlike rotor 2 in the above exemplary embodiment, the shapes in plan view of second hole 22X and second permanent magnet 40X are trapezoidal, and an entire side surface of the second hole 22X (an opposing side opposed to first hole 21) is parallel to a side surface of first hole 21. For this reason, in the structure of rotor 2X of the first comparative example illustrated in FIG. 5, the flow of the magnetic flux is hindered at a corner part (a part indicated by a broken line circle in FIG. 5) of the bottom of the trapezoid of second hole 22X.

As illustrated in FIG. 6, in rotor 2Y of the second comparative example, similarly to rotor 2 in the above-described exemplary embodiment, first hole 21 and second hole 22Y are provided in rotor core 20Y. First permanent magnet 30 is disposed in first hole 21, and second permanent magnet 40Y is disposed in the second hole 22Y.

However, in rotor 2Y of the second comparative example, unlike rotor 2 in the above exemplary embodiment, second hole 22Y and second permanent magnet 40Y have rectangular shapes in plan view. For this reason, in rotor 2Y of the second comparative example illustrated in FIG. 6, a radially outer part of a side surface of second hole 22Y (an opposing side opposed to first hole 21) is largely separated from a side surface of first hole 22. As a result, in the structure of rotor 2Y of the second comparative example, a leakage magnetic flux (broken line arrow in FIG. 6) increases. Therefore, in first permanent magnet 30 and second permanent magnet 40Y adjacent to each other, a magnetic flux of first permanent magnet 30 and a magnetic flux of second permanent magnet 40Y interfere with each other. Specifically, the magnetic flux of second permanent magnet 40Y interferes with the magnetic flux of first permanent magnet 30 adjacent to second permanent magnet 40Y. As a result, an interlinkage magnetic flux interlinked with the stator decreases.

On the other hand, in rotor 2 according to the present exemplary embodiment, as illustrated in FIG. 7, each of the plurality of second holes 22 is located closer to an inner side of rotor core 20 in the radial direction with respect to first hole 21 adjacent to second hole 22 in the circumferential direction of rotor core 20 among the plurality of first holes 21, and has protrusion 22*a* protruding toward first hole 21 adjacent to second hole 22 in the circumferential direction of rotor core 20.

With this configuration, it is possible to increase the widths of second hole 22 and first hole 21 closer to the outside in the radial direction of rotor core 20 in second hole 22 and to decrease the widths of second hole 22 and first hole 21 closer to the inside in the radial direction of rotor core 20 in second hole 22. That is, a width of bridge part 20*br*, which is a part between second hole 22 (protrusion 22*a*) and first hole 21, can be narrowed only on a radially inner side of rotor core 20 in second hole 22. As a result, it is possible to prevent the flow of the magnetic flux from being obstructed by the shape of second hole 22X as in rotor 2X of the first comparative example in FIG. 5, and it is possible to prevent the magnetic flux of first permanent magnet 30 and the magnetic flux of second permanent magnet 40Y from interfering with each other to reduce the magnetic flux interlinked with the stator as in rotor 2Y of the second comparative example in FIG. 6.

As described above, according to rotor 2 in the present exemplary embodiment, the leakage magnetic flux can be reduced, and the interlinkage magnetic flux interlinked with stator 3 can be increased.

Further, in rotor 2 in the present exemplary embodiment, the opposing side opposed to first hole 21 in protrusion 22*a* of second hole 22 is preferably parallel to the side surfaces of first permanent magnet 30 and first hole 21. That is, the width of bridge part 20br is preferably constant.

With this configuration, the leakage magnetic flux can be further reduced. Therefore, the magnetic flux interlinked with stator 3 can be further increased.

In this case, the shape of protrusion 22a in plan view may be a shape having a vertex and a width decreasing toward the vertex.

With this configuration, the opposing side opposed to first hole 21 in protrusion 22a of second hole 22 can be easily made parallel to the side surfaces of first permanent magnet 30 and first hole 21. That is, the width of bridge part 20br can be easily made constant.

Here, length l of the part where protrusion 22a and first permanent magnet 30 face each other in bridge part 20br that is a part between second hole 22 (protrusion 22a) and first hole 21 has been studied. A result of the study will be described with reference to FIG. 7.

As illustrated in FIG. 7, when a length of a part of bridge part 20br where protrusion 22a and first permanent magnet 30 face each other is denoted by l, 1 is a distance between an end surface of first permanent magnet 30 near an inner periphery of the rotor core 20 and point P. Here, point P is an outer end part of a projection image when protrusion 22a is projected onto the opposing side of first hole 21 in a direction perpendicular to the opposing side opposed to second hole 22.

A region of first permanent magnet 30 where a short-circuit magnetic flux is generated (region indicated by dot hatching in FIG. 7) is defined as region S. A radial length of rotor core 20 in region S is defined as $l_{mg}$. Assuming that a surface magnetic flux density of first permanent magnet 30 is $B'_r$, a generated magnetic flux amount φ1 of region S is expressed as $\varphi 1 = B'_r \times l_{mg}$.

Further, assuming that a magnetic flux density in magnetic saturation region MS of bridge part 20br is B's and a width of bridge part 20br on the end surface of first permanent magnet 30 is w, an amount of magnetic flux φ2 passing through magnetic saturation region MS is expressed as $\varphi 2 = B'_s \times W$.

At this time, when an amount of magnetic flux passing through a region other than magnetic saturation region MS and short-circuiting is A (A>0), φ1=φ2+A can be expressed, and the following (Expression 1) is obtained.

[Mathematical formula 1]

$$B'_r l_{mg} = B'_s w + A \quad \text{(Expression 1)}$$

Here, it is optimum that length l of the part where protrusion 22a of bridge part 20br and first permanent magnet 30 face each other is the same as radial length $l_{mg}$ of rotor core 20 in region S of first permanent magnet 30 where the short-circuit magnetic flux is generated. Therefore, when $l=l_{mg}$ is substituted in (Expression 1) above, length l of the part where protrusion 22a of bridge part 20br and first permanent magnet 30 face each other can be expressed by (Expression 2) below.

[Mathematical formula 2]

$$l = \frac{B'_s w + A}{B'_r} \quad \text{(Expression 2)}$$

Further, when a residual magnetic flux density of first permanent magnet 30 is denoted by $B_r$ and saturation magnetization of rotor core 20 is denoted by $J_s$, $B'_r < B_r$, $B'_s > J_s$ are obtained. Therefore, since A>0, the above (Expression 2) can be expressed by the following (Expression 3).

[Mathematical formula 3]

$$l > \frac{J_s w}{B_r} \quad \text{(Expression 3)}$$

From the above, length l of the part where the protrusion of bridge part 20br and the first permanent magnet face each other may satisfy the relational expression of (Expression 3) described above. By satisfying the relational expression (Expression 3), the leakage magnetic flux can be reduced, and the interlinkage magnetic flux interlinked with the stator can be effectively increased.

As described above, rotor 2 of the present exemplary embodiment includes rotor core 20 having the plurality of first holes 21 and the plurality of second holes 22, the plurality of first permanent magnets 30 arranged in the plurality of first holes 21, respectively, and rotating shaft 10 fixed to rotor core 20. The plurality of first holes 21 and the plurality of second holes 22 are provided radially around rotating shaft 10. Each of the plurality of first holes 21 extends in the radial direction of rotor core 20. A radial length of rotor core 20 in each of the plurality of second holes 22 is smaller than a radial length of rotor core 20 in each of the plurality of first holes 21. Each of the plurality of second holes 22 is located closer to an inner side in the radial direction of rotor core 20 with respect to first hole 21 adjacent to second hole 22 in a circumferential direction of rotor core 20 among the plurality of first holes 21, and includes protrusion 22a protruding toward first hole 21 adjacent to second hole 22 in the circumferential direction of rotor core 20.

Accordingly, the interlinkage magnetic flux can be increased.

In rotor 2, in each of the plurality of second holes 22, protrusion 22a is located closer to the inner side in the radial direction of rotor core 20.

With this configuration, an interlinkage magnetic flux composed of the magnetic flux of first permanent magnet 30 and the magnetic flux of second permanent magnet 40 can be increased.

In rotor 2, in each of the plurality of second holes 22, protrusion 22a includes two protrusions 22a provided on both sides across the center line extending in the radial direction of rotor core 20 in second hole 22. In this case, protrusion 22a is preferably provided line-symmetrically with respect to the center line extending in the radial direction of rotor core 20 in second hole 22.

With this configuration, even when rotor 2 rotates in both the left rotation and the right rotation, the leakage magnetic flux can be reduced and the interlinkage magnetic flux can be increased. Note that protrusion 22a may be provided on only one side instead of both sides. Further, second hole 22 having protrusion 22a only at one end, and second hole 22 having protrusion 22a only at the other end may be alternately provided in the circumferential direction.

Modification Examples

Although rotor 2 and electric motor 1 according to the present disclosure have been described above based on the exemplary embodiment, the present disclosure is not limited to the exemplary embodiment described above.

Figure 8:
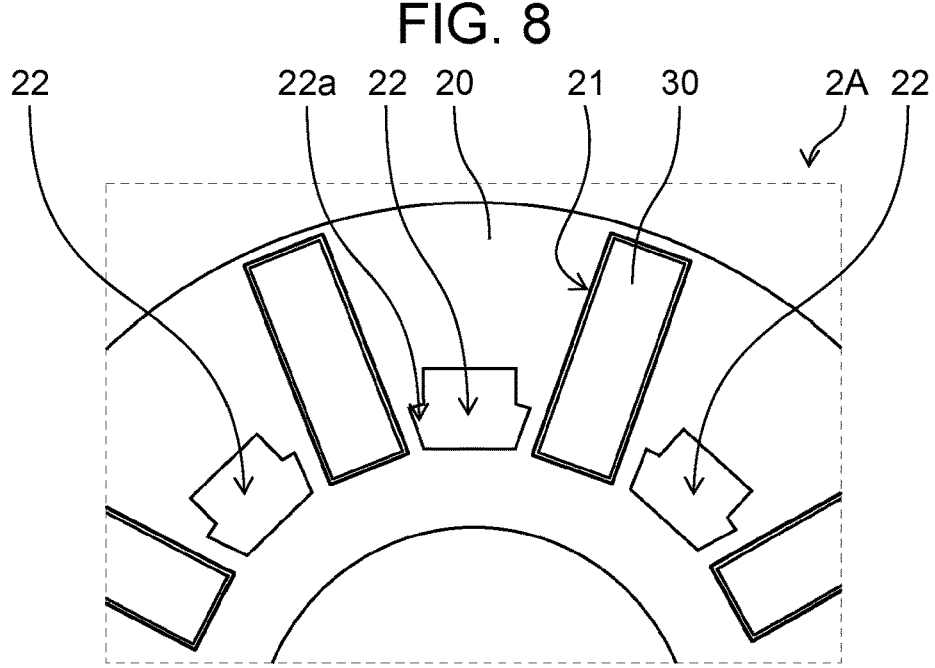
FIG. 8 is an enlarged plan view illustrating a part of a rotor according to a first modification example in an enlarged manner.

For example, in the above exemplary embodiment, second permanent magnet 40 is disposed in second hole 22, but the present invention is not limited thereto. FIG. 8 is an enlarged plan view illustrating a part of a rotor according to a first modification example in an enlarged manner. Specifically, as in rotor 2A illustrated in FIG. 8, first permanent magnet 30 may be disposed only in first hole 21 out of first hole 21 and second hole 22 without disposing second permanent magnet 40 in second hole 22. That is, in FIG. 8, each of the plurality of second holes 22 is entirely void (space region) without second permanent magnet 40. In this case, although the main magnetic flux as rotor 2A decreases by the absence of second permanent magnet 40, the leakage magnetic flux can be reduced and the interlinkage magnetic flux can be increased as compared with the case where protrusion 22a is not provided in second hole 22 in FIG. 8.

Figure 9:
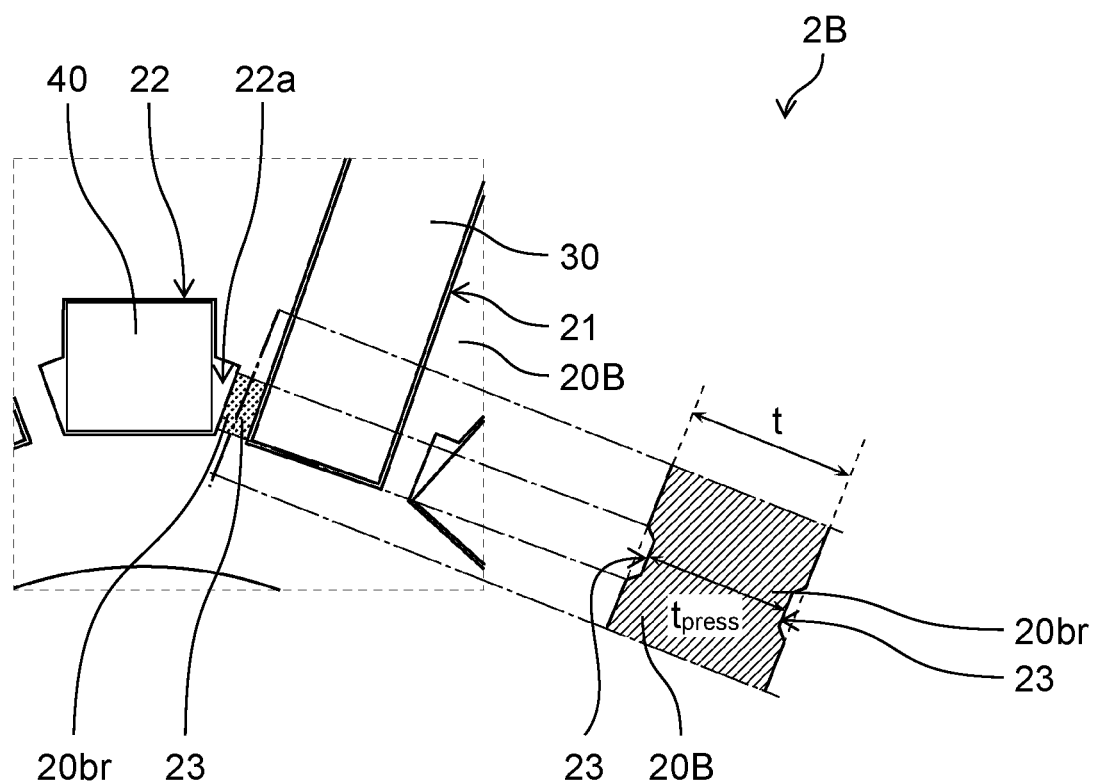
FIG. 9 is an enlarged plan view illustrating a part of a rotor according to a second modification example in an enlarged manner.

In the above exemplary embodiment, bridge part 20br is flush with the other part of rotor core 20, but the present invention is not limited thereto. FIG. 9 is an enlarged plan view illustrating a part of a rotor according to a second modification example in an enlarged manner. Specifically, as in rotor 2B illustrated in FIG. 9, the surface of bridge part 20br in rotor core 20B may be recessed in the direction of shaft center C of rotating shaft 10. For example, pressing is performed on rotor core 20B to form recess 23 (region indicated by dot hatching in the plan view of FIG. 9) in bridge part 20br, so that the surface of bridge part 20br can be recessed more than the other surfaces. As a result, thickness $t_{press}$ of bridge part 20br can be made thinner than thickness t of the part other than bridge part 20br. In this manner, by reducing the thickness by recessing bridge part 20br, the leakage magnetic flux can be further reduced, and the interlinkage magnetic flux can be further increased. Note that the present invention is not limited to the configuration in which the entire surface of bridge part 20br is recessed, and at least a part of bridge part 20br may be recessed.

Figure 10:
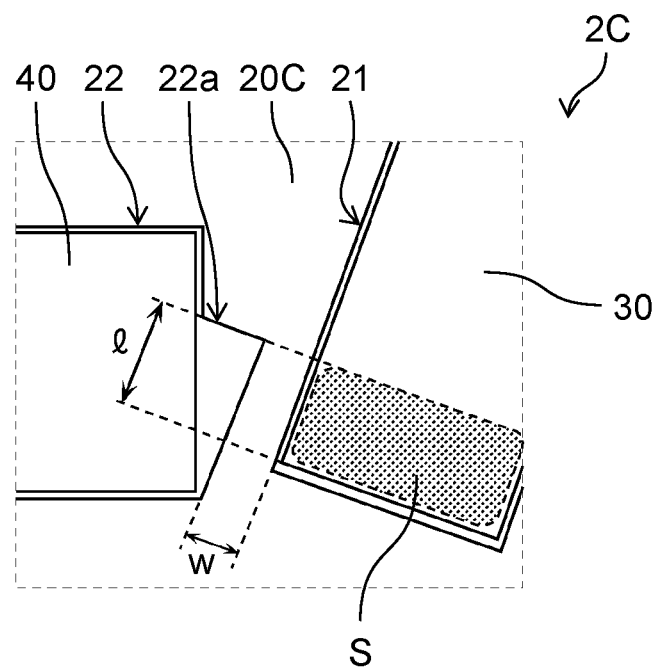
FIG. 10 is an enlarged plan view illustrating a part of a rotor according to a third modification example in an enlarged manner.

In the above exemplary embodiment, as illustrated in FIG. 7, the part of protrusion 22a located closest to the inner side in the radial direction of rotor core 20 is in the vicinity of the surface on the side surface of first permanent magnet 30 near the inner periphery of the rotor core 20, but the present invention is not limited thereto. FIG. 10 is an enlarged plan view illustrating a part of a rotor according to a third modification example in an enlarged manner. Specifically, as in rotor core 20C of rotor 2C illustrated in FIG. 10, a part of protrusion 22a may be present on the inner side in the radial direction of rotor core 20 than the inner surface of first permanent magnet 30.

Figure 11:
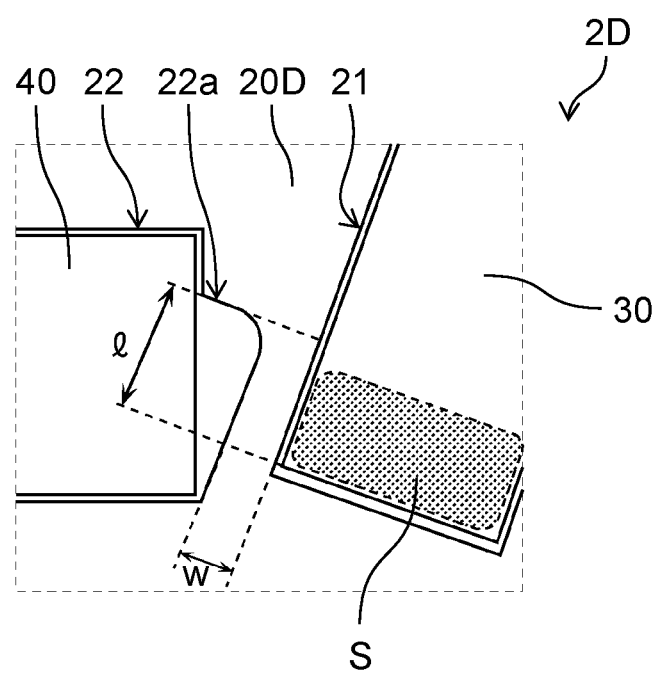
FIG. 11 is an enlarged plan view illustrating a part of a rotor according to a fourth modification example in an enlarged manner.

In the above exemplary embodiment, the planar view shape of protrusion 22a of second hole 22 is a polygon including only linear sides, and the side surface of protrusion 22a is configured only by a plane, but the present invention is not limited thereto. FIG. 11 is an enlarged plan view illustrating a part of a rotor according to a fourth modification example in an enlarged manner. For example, as in rotor core 20D of rotor 2D illustrated in FIG. 11, one of side surfaces of protrusion 22a may include a curved surface. In this case, as in the above-described exemplary embodiment, it is preferable that the side surface of protrusion 22a facing first hole 21 is a flat surface, and the side surface of protrusion 22a facing first hole 21 is parallel to the side surface of first hole 21. That is, in plan view, the opposing side opposed to first hole 21 in protrusion 22a is preferably parallel to one side of first hole 21.

Figure 12:
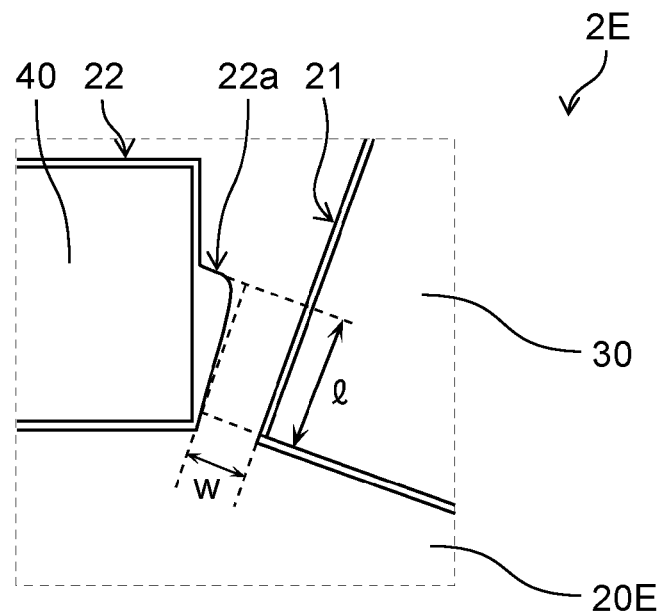
FIG. 12 is an enlarged plan view illustrating a part of a rotor according to a fifth modification example in an enlarged manner.
Figure 13:
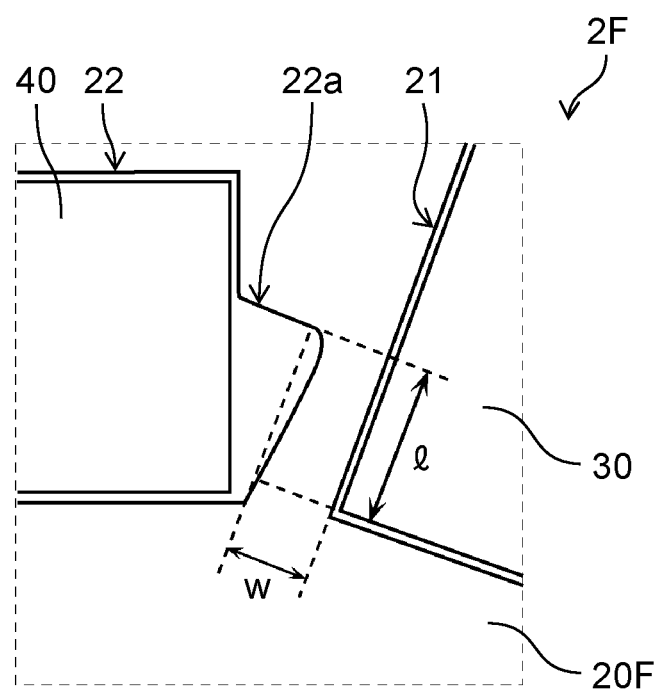
FIG. 13 is an enlarged plan view illustrating a part of a rotor according to a sixth modification example in an enlarged manner.

In the above exemplary embodiment, the opposing side opposed to first hole 21 in protrusion 22a is parallel to one side of first hole 21, but the present invention is not limited thereto. FIG. 12 is an enlarged plan view illustrating a part of a rotor according to a fifth modification example in an enlarged manner. For example, as in rotor core 20E of rotor 2E illustrated in FIG. 12, an opposing side opposed to first hole 21 in protrusion 22a may not be parallel to one side of first hole 21. FIG. 13 is an enlarged plan view illustrating a part of a rotor according to a sixth modification example in an enlarged manner. Similarly, as in rotor core 20F of rotor 2F illustrated in FIG. 13, an opposing side opposed to first hole 21 in protrusion 22a may not be parallel to one side of first hole 21 of rotor core 20F. For example, as illustrated in FIG. 12, protrusion 22a may be provided such that the opposing side of protrusion 22a is away from one side of first hole 21, or as illustrated in FIG. 13, protrusion 22a may be provided such that the opposing side of protrusion 22a approaches one side of first hole 21. Further, although not illustrated, the opposing side of protrusion 22a may be constituted by a plurality of straight lines. Furthermore, although not illustrated, the opposing side of protrusion 22a may be configured by a plurality of curves, or may be configured by a combination of one or more straight lines and one or more curves.

Further, in the exemplary embodiment described above, the cross-sectional shape of each of second holes 22 is the same in the direction of shaft center C of rotating shaft 10 in any cross section taken along a plane orthogonal to rotating shaft 10. However, the present disclosure is not limited to this.

Figure 14:
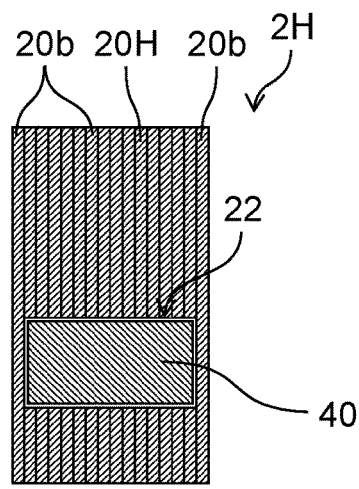
FIG. 14 is a partial cross-sectional view of a rotor according to a seventh modification example.

FIG. 14 is a partial cross-sectional view of a rotor according to a seventh modification example. For example, as in rotor core 20H of rotor 2H illustrated in FIG. 14, at least two of the plurality of steel sheets 20b are not provided with second holes 22, steel sheet 20b located between two steel sheets 20b of the plurality of steel sheets 20b not provided with second hole 22 may be provided with second holes 22, and second permanent magnet 40 may be sandwiched between two steel sheets 20b not provided with second holes 22. Specifically, in rotor core 20H in FIG. 14, steel sheets 20b at both ends of the plurality of steel sheets 20b are not provided with second holes 22, and second permanent magnet 40 is sandwiched between steel sheet 20b at one end and steel sheet 20b at the other end. As a result, second permanent magnet 40 can be held in second hole 22 without using an adhesive.

Figure 15:
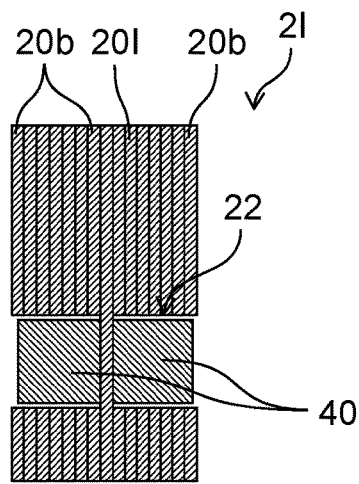
FIG. 15 is a partial cross-sectional view of a rotor according to an eighth modification example.

FIG. 15 is a partial cross-sectional view of a rotor according to an eighth modification example. Like rotor core 20I of rotor 2I illustrated in FIG. 15, at least one of the plurality of steel sheets 20b may not be provided with second holes 22, and two second permanent magnets 40 may be disposed via steel sheet 20b not provided with second holes 22. Specifically, in rotor core 20I in FIG. 15, two second permanent magnets 40 are disposed in one second hole 22. With this configuration, the plurality of second permanent magnets 40 can be easily inserted into one second hole 22. Note that three or more second permanent magnets 40 may be disposed in one second hole 22.

Figure 16:
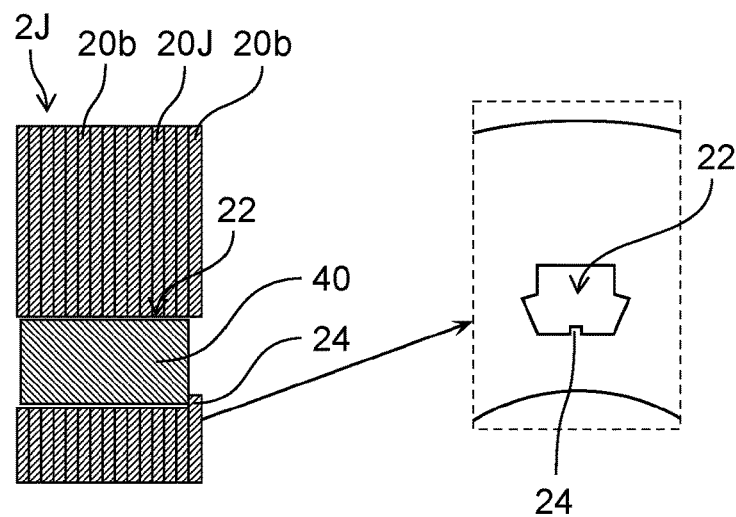
FIG. 16 is a partial cross-sectional view of a rotor according to a ninth modification example.

FIG. 16 is a partial cross-sectional view of a rotor according to a ninth modification example. Like rotor core 20J of rotor 2J illustrated in FIG. 16, at least one of the plurality of steel sheets 20b may have projection 24 protruding from a part of the side of second hole 22 toward the inside of second hole 22. Specifically, in rotor core 20J in FIG. 16, projection 24 is provided in second hole 22 in one of steel sheets 20b located at both ends among the plurality of steel sheets 20b. With this configuration, since projection 24 functions as a stopper when second permanent magnet 40 is inserted into second hole 22, second permanent magnet 40 can be easily held in second hole 22. Projection 24 is not limited to being formed in all of second holes 22 formed in one rotor core 20J, and may be formed only in some of second holes 22.

Figure 17:
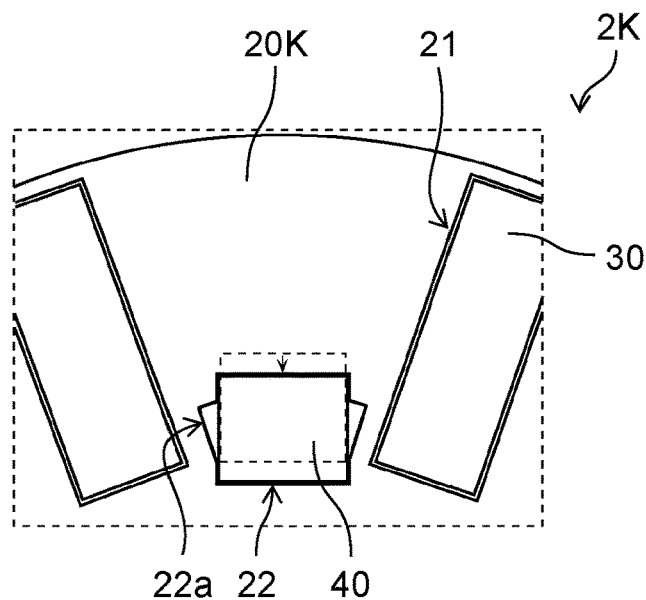
FIG. 17 is an enlarged plan view illustrating a part of a rotor according to a tenth modification example in an enlarged manner.

In the above exemplary embodiment, the sides of second hole 22 and second permanent magnet 40 on the inner peripheral side (side of rotating shaft 10) are located at the same positions as the sides of first hole 21 and first permanent magnet 30 on the inner peripheral side, but the present invention is not limited thereto. FIG. 17 is an enlarged plan view illustrating a part of a rotor according to a tenth modification example in an enlarged manner. For example, as in rotor core 20K of rotor 2K illustrated in FIG. 17, the sides of second hole 22 and second permanent magnet 40 on the inner peripheral side may be located on an inner peripheral side (side of rotating shaft 10) of the inner peripheral sides of first hole 21 and first permanent magnet 30. That is, second hole 22 and second permanent magnet 40 may be located on the inner peripheral side of first hole 21 and first permanent magnet 30. Alternatively, although not illustrated, the inner peripheral sides of second hole 22 and second permanent magnet 40 may be located nearer an outer periphery of the rotor core 20K than a place that the inner peripheral sides of first hole 21 and first permanent magnet 30 be located on.

Figure 18:
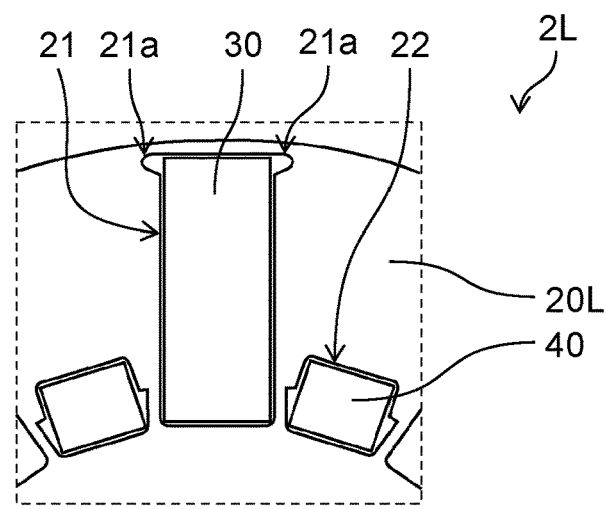
FIG. 18 is an enlarged plan view illustrating a part of a rotor according to an eleventh modification example in an enlarged manner.

In the above exemplary embodiment, a void part is not formed in first hole 21 into which first permanent magnet 30 is inserted, but the present invention is not limited thereto. FIG. 18 is an enlarged plan view illustrating a part of a rotor according to an eleventh modification example in an enlarged manner. For example, as in rotor core 20L of rotor 2L illustrated in FIG. 18, void parts 21a may be formed as flux barriers at both ends of first hole 21 at an outer periphery of rotor core 20L. With this configuration, even if the torque ripple increases as a result of reducing the leakage magnetic flux by using first permanent magnet 30 and second permanent magnet 40 and providing protrusion 22a in second hole 22, the torque ripple can be reduced by forming void part 21a in first hole 21.

Figure 19:
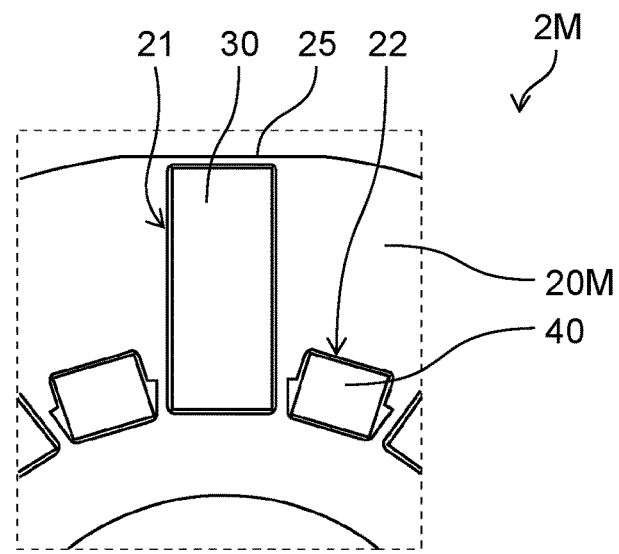
FIG. 19 is an enlarged plan view illustrating a part of a rotor according to a twelfth modification example in an enlarged manner.

In the above exemplary embodiment, rotor core 20 having a circular outer peripheral shape in plan view is used, but the present invention is not limited thereto. FIG. 19 is an enlarged plan view illustrating a part of a rotor according to a twelfth modification example in an enlarged manner. Specifically, as in rotor 2M illustrated in FIG. 19, rotor core 20M in which flat face 25 is formed in an outer periphery part so as to have a straight line in a part of an outer peripheral shape in plan view may be used. For example, in rotor core 20M illustrated in FIG. 19, flat face 25 is formed at a part facing first hole 21. With this configuration, even if the torque ripple increases as a result of reducing the leakage magnetic flux by using first permanent magnet 30 and second permanent magnet 40 and providing protrusion 22a in second hole 22, the torque ripple can be reduced by forming flat face 25 on the outer periphery of rotor core 20M.

Figure 20:
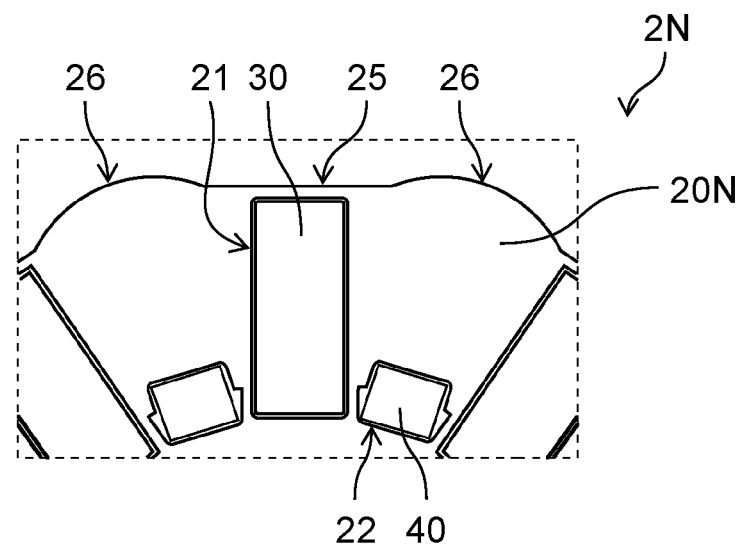
FIG. 20 is an enlarged plan view illustrating a part of a rotor according to a thirteenth modification example in an enlarged manner.

FIG. 20 is an enlarged plan view illustrating a part of a rotor according to a thirteenth modification example in an enlarged manner. As in rotor core 20N of rotor 2N illustrated in FIG. 20, the torque ripple can be further reduced by forming not only flat face 25 but also bulging surface 26 on the outer periphery. Bulging surface 26 is a curved surface curved so as to bulge outward, and is formed in a part facing second hole 22 in FIG. 20.

Figure 21:
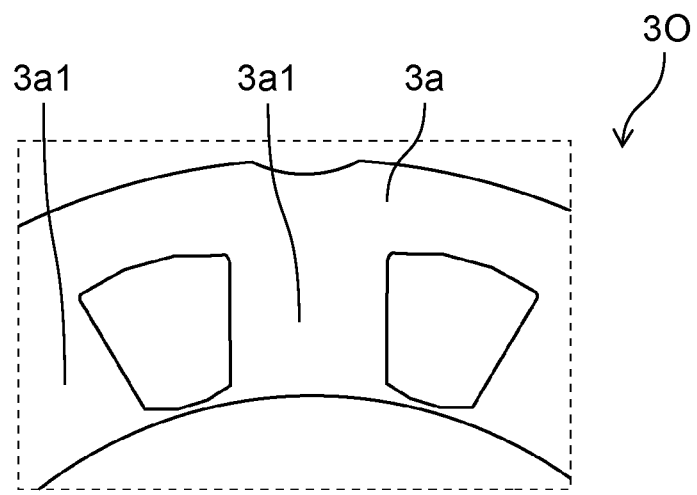
FIG. 21 is a partial cross-sectional view of a stator in an electric motor according to a fourteenth modification example.

Stator 3 in the above exemplary embodiment is an open slot stator in which an opening is provided between the tips of two adjacent teeth 3a1 in stator core 3a, but the present invention is not limited thereto. FIG. 21 is a partial cross-sectional view of a stator in an electric motor according to a fourteenth modification example. For example, as in stator 3O illustrated in FIG. 21, a closed slot stator in which tips of two adjacent teeth 3a1 in stator core 3a are connected to each other may be used. With this configuration, even if the torque ripple increases as a result of reducing the leakage magnetic flux by using first permanent magnet 30 and second permanent magnet 40 and providing protrusion 22a in second hole 22, the torque ripple can be reduced by using the closed slot stator as stator 3O.

Figure 22:
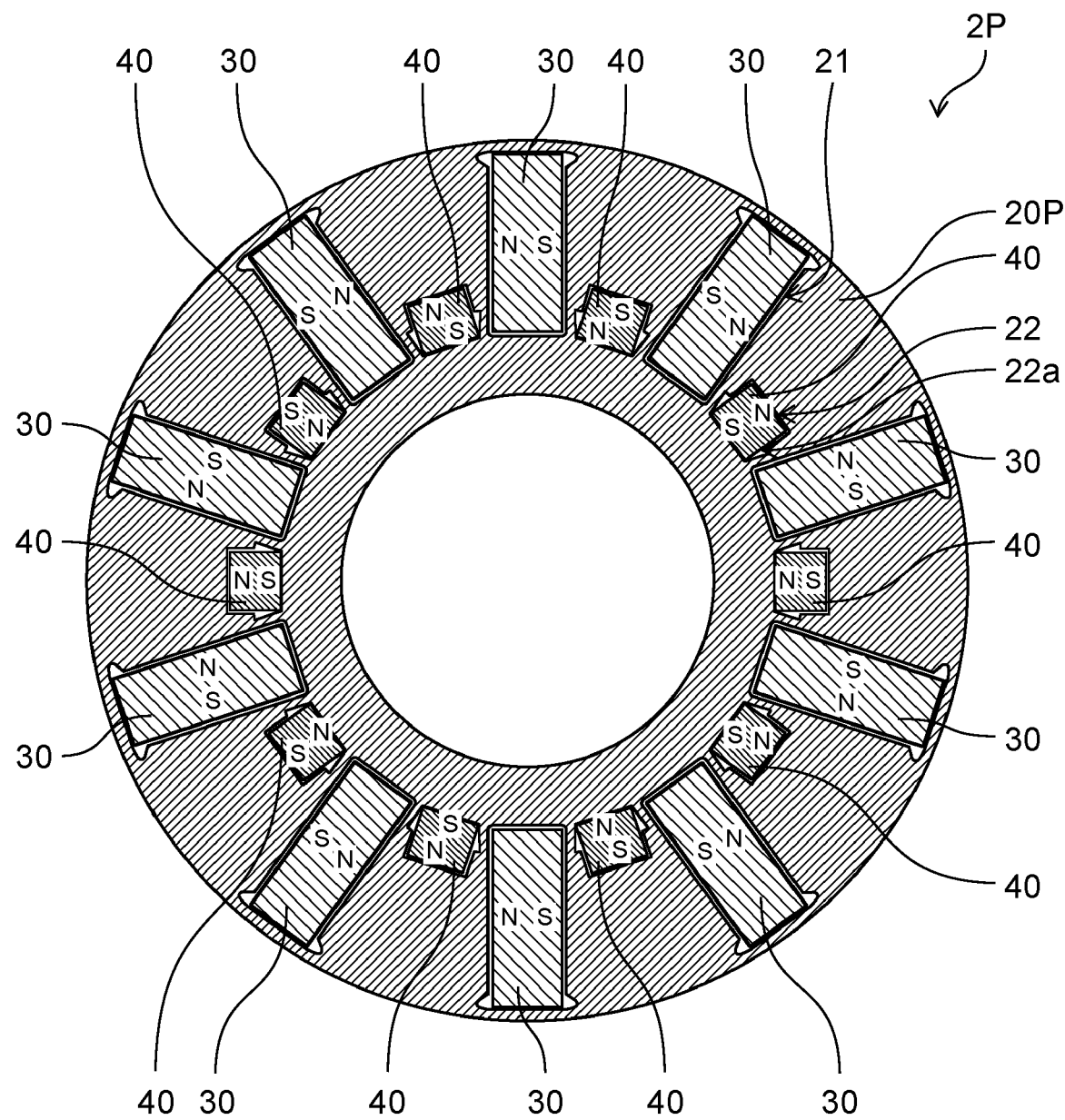
FIG. 22 is a cross-sectional view of a rotor according to a fifteenth modification example.

In rotor 2 in the above exemplary embodiment, the number of magnetic poles is eight, but the present invention is not limited thereto. FIG. 22 is a cross-sectional view of a rotor according to a fifteenth modification example. For example, as in rotor 2P illustrated in FIG. 22, the number of magnetic poles may be 10. In this case, 10 first permanent magnets 30 and 10 second permanent magnets 40 are arranged in the circumferential direction so that the magnetic poles of the S pole and the N pole are alternately positioned in the circumferential direction as the main magnetic flux. That is, 10 first holes 21 and 10 second holes 22 are alternately provided in rotor core 20P of rotor 2P illustrated in FIG. 22. Note that the number of magnetic poles of the rotor may be other than 8 and 10, and any number is applied as long as the number of magnetic poles of the rotor is 2n (n is a natural number).

In the above exemplary embodiment, all of second holes 22 provided in rotor core 20 have protrusion 22a, but the present invention is not limited thereto. For example, the plurality of second holes 22 may include second hole 22 having no protrusion 22a.

In the above exemplary embodiment, protrusion 22a of second hole 22 is a void part, but the present invention is not limited thereto. For example, second permanent magnet 40 may be embedded in entire second hole 22 including protrusion 22a. That is, the planar view shape and size of second permanent magnet 40 may be substantially the same as the planar view shape and size of second hole 22. In this case, second permanent magnet 40 may be a sintered magnet, but a sintered magnet having a shape other than a rectangular parallelepiped is difficult to process and increases the cost. Therefore, when second permanent magnet 40 is embedded in entire second hole 22 including protrusion 22a, second permanent magnet 40 is preferably a bonded magnet. First permanent magnet 30 is not limited to a sintered magnet, and may be a bonded magnet.

In the above exemplary embodiment, first permanent magnet 30 is used as a main magnet, and second permanent magnet 40 is used as an auxiliary magnet, but the present invention is not limited thereto. For example, second permanent magnet 40 may be used as a main magnet, and first permanent magnet 30 may be used as an auxiliary magnet.

Further, the electric motor including the rotor according to each of the above exemplary embodiments can be used for various electric devices. For example, the present invention can be used for home electric devices such as a vacuum cleaner, an air conditioner, and a refrigerator, or industrial electric devices such as an automobile device and a robot.

The technique of the present disclosure can be used for a rotor such as an IPM rotor. The technique of the present disclosure can be widely used not only for a rotor but also for various products such as an electric motor including a rotor and an electric device including an electric motor.

The invention claimed is:

1. A rotor comprising:
an iron core including a plurality of first holes and a plurality of second holes;
a plurality of first permanent magnets arranged in the plurality of first holes, respectively; and
a rotating shaft fixed to the iron core, wherein:
the plurality of first holes and the plurality of second holes are provided radially around the rotating shaft,
each of the plurality of first holes extends in a radial direction of the iron core,
each of the plurality of second holes has a length in the radial direction of the iron core, and the length being smaller than a length of each of the plurality of first holes in the radial direction of the iron core,
each of the plurality of second holes is located closer to an inner side in the radial direction of the iron core with respect to a first hole adjacent to the second hole in a circumferential direction of the iron core among the plurality of first holes, and includes a protrusion protruding toward the first hole adjacent to the second hole in the circumferential direction of the iron core,
in a second hole among the plurality of second holes, a side of the second hole facing the first hole includes a first side opposed to one side of the first hole, a second side and a third side, and
an angle formed by the first side and the one side of the first hole is in a range from −5° to 5° inclusive, the second side extends from an end of the first side toward inside the second hole and the third side extends from an end of the second side in the radial direction.

2. The rotor according to claim 1, wherein in each of the plurality of second holes, the protrusion includes two protrusions provided on both sides across a center line extending in the radial direction of the iron core in the second hole.

3. The rotor according to claim 2, wherein the two protrusions are provided line-symmetrically with respect to the center line.

4. The rotor according to claim 1, wherein in each of the plurality of second holes, the protrusion is located closer to an inner side in the radial direction of the iron core.

5. The rotor according to claim 1, wherein a plan view shape of the protrusion is a shape having an apex and a width narrowing toward the apex.

6. The rotor according to claim 1, wherein
the iron core includes a bridge part that is a part between the protrusion and the first hole, and
a relational expression below is satisfied:

$$1 > \frac{J_S w}{B_r},$$

where
l is a length in the radial direction of the iron core at a part where each of the plurality of first permanent magnets and the protrusion adjacent to each other in the bridge part face each other,
w is a width of the bridge part at a part located on an innermost side in the radial direction of the iron core among parts where the first magnet and the protrusion adjacent to each other face each other,
$B_r$ is a residual magnetic flux density of the first permanent magnet, and
$J_S$ is a saturation magnetization of the iron core.

7. The rotor according to claim 1, wherein the first side and the one side are parallel.

8. The rotor according to claim 1, wherein each of the plurality of second holes includes no magnet and is entirely void.

9. An electric motor comprising:
the rotor according to claim 1; and
a stator that is disposed to face the rotor via an air gap and generates a magnetic force acting on the rotor.

10. A rotor comprising:
an iron core including a plurality of first holes and a plurality of second holes;
a plurality of first permanent magnets arranged in the plurality of first holes, respectively;
a plurality of second permanent magnets arranged in the plurality of second holes, respectively; and
a rotating shaft fixed to the iron core, wherein:
the plurality of first holes and the plurality of second holes are provided radially around the rotating shaft,
each of the plurality of first holes extends in a radial direction of the iron core,
each of the plurality of second holes has a length in the radial direction of the iron core, and the length being smaller than a length of each of the plurality of first holes in the radial direction of the iron core, and
each of the plurality of second holes is located closer to an inner side in the radial direction of the iron core with respect to a first hole adjacent to the second hole in a circumferential direction of the iron core among the plurality of first holes, and includes a protrusion protruding toward the first hole adjacent to the second hole in the circumferential direction of the iron core.

11. The rotor according to claim 10, wherein each of the plurality of second permanent magnets does not exist in the protrusion.

12. The rotor according to claim 10, wherein an adhesive that fixes each of the plurality of second holes and each of the plurality of second permanent magnets exists in at least a part of the protrusion.

13. The rotor according to claim 10, wherein each of the plurality of second holes is a through hole penetrating the iron core.

14. The rotor according to claim 10, wherein
the iron core is formed of a plurality of steel sheets stacked in an axial direction of the rotating shaft,
at least two of the plurality of steel sheets are not provided with the second holes,
a steel sheet positioned between two steel sheets of the plurality of steel sheets not provided with the second holes is provided with each of the plurality of second holes, and
each of the plurality of second permanent magnets is sandwiched between the two steel sheets not provided with the second holes.

15. The rotor according to claim 10, wherein
the iron core is formed of a plurality of steel sheets stacked in an axial direction of the rotating shaft,
at least one of the plurality of steel sheets is not provided with each of the plurality of second holes, and
two of the second permanent magnets are disposed via the steel sheet not provided with the second hole.

16. The rotor according to claim 10, wherein the iron core is formed of a plurality of steel sheets stacked in an axial direction of the rotating shaft, and at least one of the plurality of steel sheets includes a projection protruding from a part of a side of each of the plurality of second holes toward an inside of the second hole.

17. A rotor comprising:
an iron core including a plurality of first holes and a plurality of second holes;
a plurality of first permanent magnets arranged in the plurality of first holes, respectively; and
a rotating shaft fixed to the iron core, wherein:
the plurality of first holes and the plurality of second holes are provided radially around the rotating shaft,
each of the plurality of first holes extends in a radial direction of the iron core,
each of the plurality of second holes has a length in the radial direction of the iron core, and the length being smaller than a length of each of the plurality of first holes in the radial direction of the iron core,
each of the plurality of second holes is located closer to an inner side in the radial direction of the iron core with respect to a first hole adjacent to the second hole in a circumferential direction of the iron core among the plurality of first holes, and includes a protrusion protruding toward the first hole adjacent to the second hole in the circumferential direction of the iron core,
the iron core includes a bridge part that is a part between the protrusion and each of the plurality of first holes, and
at least a part of a surface of the bridge part is recessed in an axial direction of the rotating shaft.

* * * * *